UNITED STATES PATENT OFFICE.

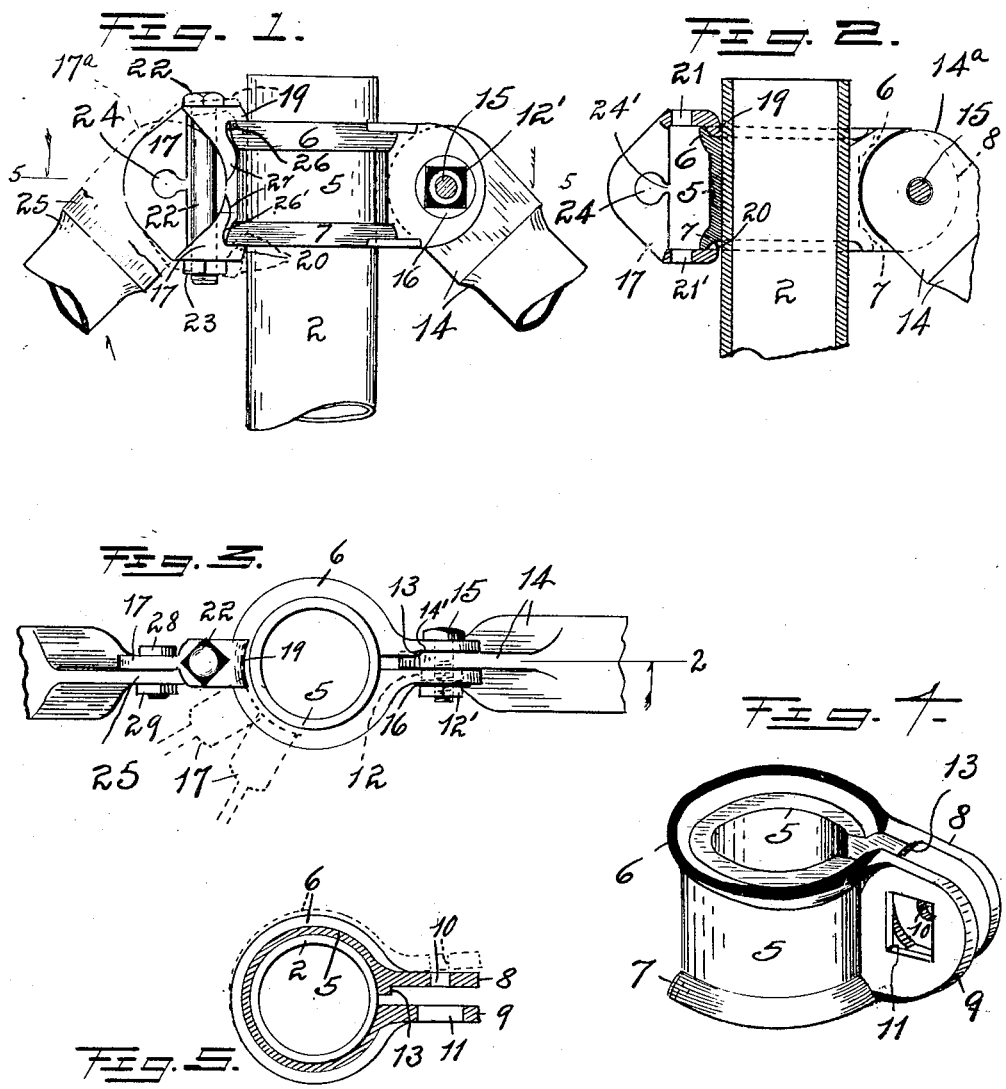

PERRY C. JAMES, OF SCIOTA, ILLINOIS.

FENCEPOST-CLAMP.

1,330,808.  Specification of Letters Patent.  Patented Feb. 17, 1920.

Application filed December 8, 1917. Serial No. 206,321.

*To all whom it may concern:*

Be it known that I, PERRY C. JAMES, a citizen of the United States, and resident of Sciota, in the county of McDonough and State of Illinois, have invented a new and useful Fencepost-Clamp, of which the following is a specification.

My invention relates to clamps which are secured to fence-posts, and especially to the corner and terminal posts, in order to brace and hold them erect, and the principal object of the invention is to improve the construction and increase the capacity, utility and efficiency of devices of this character.

The invention consists, substantially, in the improvements hereinafter described.

By way of example, and in order that the nature and operation of the device may be more fully understood, a fence-clamp constructed in accordance with the principles of this invention is illustrated in the accompanying drawings, in which:

Figure 1 is an elevation showing a preferred form of my improvements secured to the upper portion of a fence-post;

Fig. 2, a vertical central section taken in the line 2—2 in Fig. 3;

Fig. 3, a top plan;

Fig. 4, an enlarged perspective of the post-clamping member; and

Fig. 5, a transverse sectional detail taken in the plane of the line 5—5 in Fig. 1.

Considering the drawings in detail and referring to the elements and, where necessary, to the parts thereof, each by a distinguishing reference numeral, 2 indicates a tubular fence-post to which is attached a spring post-clamp comprising a loop 5 having upper and lower hook-flanges 6 and 7 respectively, the end portions of the loop forming ears 8 and 9 having respectively a bolt-hole 10 and an enlarged and preferably angular opening 11 of sufficient size to permit the passage therethrough of a nut 12 which shall presently be again referred to. 13 indicates a shoulder formed in one of the ears and preferably, as shown, in the ear 8. 14 denotes the upper end portion of a rod hinged by a bolt 15 between the ears 8 and 9, its lower end (not shown) being adapted to engage any suitable anchor, also not shown. 14′ indicates a shoulder near its inner extremity, adapted to contact the shoulder 13. After the link 14 has been positioned a bolt 15 is passed through the aperture 10, thence through the transverse aperture in said link, and then engaged with the threads of the nut 12 to draw it to bear against the flattened end of the link 14. A washer 16 is then to be positioned as shown best in Fig. 3, partly covering the opening 11, and the nut 12′ is then threaded up snugly on the bolt 15 to thereby draw the ears 8 and 9 toward each other, thus diminishing the circumference of the loop 5 and causing it to firmly clamp the post.

17 indicates a gripping iron having oppositely directed hooks 19, 20 and having registering longitudinally formed apertures 21, 21′ for the reception of a bolt 22. 23 is a securing nut. The iron 17 is also provided with a transverse aperture 24 which registers with a transverse aperture in the upper end of a link 25, the lower end of which (not shown) is adapted to engage any suitable anchor, not shown. The iron 17 is recessed, as indicated at 26, 26′ to form a pocket for the adjacent flange 6 or 7 as the case may be, and is provided with a tongue or projection 27.

After the clamping loop 5 has been secured on the post 2 and the link 14 engaged with an held by the anchor, the iron 17—which preferably is made of malleable iron and therefore adapted to yield without breaking, and in which the terminals of the hooks 19 and 20 are preferably normally (or before assemblage) so spaced from each other that they will pass over the flanges 6 and 7, as indicated by the dotted lines in Fig. 1—is positioned as shown by said dotted lines. The nut 23 is then threaded taut upon the bolt 22 to thereby spring or draw the hooks 19 and 20 toward each other to cause them to engage the hook-flanges 6 and 7 and thus secure the iron 17 rigidly to the loop 5. The link 25 may then be secured to the iron 17, by means of the bolt 28 and nut 29 (Fig. 3) in an evident manner and at any desired angle or inclination to a perpendicular. It is to be particularly observed that the hooks 19 and 20 may be engaged with any part of the circumference of the hook-flanges 6 and 7, thus permitting the anchor-link 25 to be arranged at substantially any position relative to the anchor link 14. Also it is to be noted that the loop 5 may be set at any position circumferentially of the post, and that the link 14 may be inclined at any angle with reference to the post.

Any suitable number of the irons 17, it will be clear, may be employed in connection with a single loop 5.

The fence-wires, or one line of them, will be secured to the post in such manner that they will tend to draw the post toward or in the direction of the anchor member 14. The shoulder 13 will thus be drawn against the shoulder 14' and the latter will offer ample resistance to prevent the movement of the post in the direction stated.

The grip-iron 17 may if preferred be made in two parts each of which is provided with one of the hooks 19, 20, and the two parts suitably connected, and in some cases it is necessary to use but one of the hooks.

It has not been thought either necessary or best to encumber this specification and the accompanying drawings with descriptions and illustrations of modifications which are neither essential to nor form any part of the invention, considered in its broadest aspect. In fact, I realize that considerable variation is easily possible, with respect to the details of construction, without departing from the spirit of the invention. Therefore I do not intend to limit myself to the specific construction herein shown and described except as pointed out in the following claims, wherein it is my intention to claim as broadly as is permitted by the state of the art all the novelty inherent in the invention.

Having thus described the nature of my invention I claim as new the following, to-wit:

1. A device of the kind described comprising in combination an element adapted to be secured to a post, diverging hook-like flanges on said element, hooks adapted to engage said flanges, means for drawing said hooks together into gripping engagement with said flanges, and an anchor member connected with said hooks.

2. A device of the kind described comprising in combination an element adapted to be secured to a post, diverging hook-like flanges on said element, hooks adapted to engage said flanges, means for drawing said hooks together into gripping engagement with said flanges, and an anchor member hingedly connected with said hooks.

3. A device of the kind described comprising in combination an annular element adapted to be secured to a post, diverging hook-like flanges on said element, hooks adapted to engage any circumferential portion of said flanges, means for drawing said hooks together into gripping engagement with a selected portion of said flanges, and an anchor member connected with said hooks.

4. A device of the kind described comprising in combination a ring-shaped clamp adapted to slide upon a post, means for drawing the ends of the clamp together to grip the post in selected position, diverging hook-like flanges on the clamp, an anchor member, a clamping member having hooks adapted to engage and grip said flanges therebetween, and means for connecting said anchor and clamping members together.

5. A device of the kind described comprising in combination a clamp adapted to slide upon a post, means for drawing the ends of the clamp together to grip the post in selected position, an anchor member adapted to swing about the axis of the post without changing the position of said clamp and means for clamping the anchor member to said clamp in any selected radial position.

6. A device of the kind described comprising in combination an annular element adapted to be secured to a post, an anchor member adapted to swing about the axis of the post without changing the position of said element, and means for clamping the anchor member to said element in any selected radial position.

7. In a device of the nature described, an element rotatable on a post, means for locking it in selective position on the post, a member engaging and rotatable on said element about the axis of the post as a center, and an anchor-member to which the last recited member is connected.

8. In a device of the nature described, an element adapted for securement on a post and having hook-like flanges arranged circumferentially thereof, an element having hooks arranged one at its upper and one at its lower portion and adapted to engage the corresponding flange of the first recited element, and an anchor member to which the last recited element is connected.

9. In a device of the nature described, a post-engaging element, an element having hooks which engage it and grip it therebetween, and an anchor-member connected with the hooked element.

10. In a device of the nature described, a post-engaging element having an upper and a lower hook-like flange, a gripping-iron having an upper and a lower hook, and means for drawing said hooks into engagement with the corresponding flanges aforesaid.

11. In a device of the nature described, an annular post-clamping element having an upper and a lower circumferential flange, a hooked element adapted to engage the outer faces of both of said flanges in any selected radial position, means for securing it to an anchor, and means for securing the post-clamping element to another anchor and simultaneously clamp the post-clamping element to the post.

12. In a device of the nature described, a post-engaging element, an element adapted to grip into its upper and lower portions in any selected radial position, means for securing the post-engaging element to one anchor, and means for securing the gripping element to another anchor and simultaneously clamp the post-clamping element to the post.

13. In a device of the nature described, a post-engaging element, an element adapted to be forced into engagement with its upper and lower portions in any selected radial position, means for forcing it as stated, means for connecting it with an anchor-member, and means for connecting the post-engaging element with another anchor-member and simultaneously clamp the post-clamping element to the post.

In witness whereof I hereunto sign my name, at Galesburg, Knox county, Illinois, this 21st day of November, 1917.

PERRY C. JAMES.